United States Patent
Townsend et al.

(10) Patent No.: US 9,304,674 B1
(45) Date of Patent: Apr. 5, 2016

(54) DEPTH-BASED DISPLAY NAVIGATION

(71) Applicant: Rawles LLC, Wilimgton, DE (US)

(72) Inventors: Matthew Alan Townsend, Redwood City, CA (US); Deon Poncini, Sunnyvale, CA (US); Daniel Christopher Bay, Santa Clara, CA (US); Bryan Harris, San Francisco, CA (US); Edward Dietz Crump, Santa Cruz, CA (US); Jason Zimmer, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 14/133,100

(22) Filed: Dec. 18, 2013

(51) Int. Cl.
| | |
|---|---|
| *G06F 3/0482* | (2013.01) |
| *G06T 19/00* | (2011.01) |
| *G06F 3/0488* | (2013.01) |
| *G06F 3/0487* | (2013.01) |
| *G06F 3/01* | (2006.01) |
| *G06F 3/0481* | (2013.01) |
| *G06F 3/0484* | (2013.01) |

(52) U.S. Cl.
CPC .............. *G06F 3/0487* (2013.01); *G06F 3/017* (2013.01); *G06F 3/0482* (2013.01); *G06F 3/011* (2013.01); *G06F 3/0488* (2013.01); *G06F 3/04815* (2013.01); *G06F 3/04842* (2013.01); *G06T 19/00* (2013.01)

(58) Field of Classification Search
CPC ....... G06F 3/017; G06F 3/011; G06F 3/0482; G06F 3/04815; G06F 3/04842; G06F 3/0488; G06T 19/00

USPC .......................................................... 715/773
See application file for complete search history.

(56) References Cited

U.S. PATENT DOCUMENTS

| | | | |
|---|---|---|---|
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,884,876 | B2 * | 11/2014 | Song et al. ................. 345/158 |
| 2010/0287468 | A1 * | 11/2010 | Reifman et al. ........... 715/702 |
| 2010/0321289 | A1 * | 12/2010 | Kim et al. .................. 345/156 |
| 2011/0022307 | A1 * | 1/2011 | Lee ............................ 701/202 |
| 2011/0047459 | A1 * | 2/2011 | Van Der Westhuizen .. 715/702 |
| 2011/0216091 | A1 * | 9/2011 | Song et al. ................. 345/634 |

(Continued)

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Ting Lee
(74) *Attorney, Agent, or Firm* — Lee & Hayes, PLLC

(57) ABSTRACT

A system for navigating content may be responsive to movement of a hand by a user toward and away from a display surface. The content may be visually arranged and presented as a stack of visual panes. Moving the hand away from the display surface causes the panes to move upwardly through the stack. Moving the hand toward the display surface causes the panes to move downwardly through the stack. When moving upward, the otherwise topmost pane is deactivated and hidden. Upon reaching the top of the stack, a pane is activated and displayed in full.

19 Claims, 5 Drawing Sheets

(56) References Cited

U.S. PATENT DOCUMENTS

| | | |
|---|---|---|
| 2011/0289455 A1* | 11/2011 | Reville et al. ............... 715/830 |
| 2012/0223885 A1 | 9/2012 | Perez |
| 2013/0019201 A1* | 1/2013 | Cabrera-Cordon et al. .. 715/810 |
| 2013/0033483 A1* | 2/2013 | Im et al. ..................... 345/419 |
| 2013/0047121 A1* | 2/2013 | Kao et al. ................... 715/810 |
| 2013/0159934 A1* | 6/2013 | Kang .......................... 715/838 |
| 2014/0089849 A1* | 3/2014 | Choi et al. .................. 715/810 |
| 2014/0184496 A1* | 7/2014 | Gribetz et al. .............. 345/156 |

* cited by examiner

DEPTH-BASED DISPLAY NAVIGATION

BACKGROUND

User interfaces have traditionally relied on input devices such as keyboards and dedicated active displays such as electronic monitors. Increasingly, however, it is desired to interact with users in more natural ways, such as by projecting content onto various available surfaces (such as walls) and by reacting to speech and gestures of users.

BRIEF DESCRIPTION OF THE DRAWINGS

In the accompanying figures, the left-most digit(s) of a reference number identifies the figure in which the reference number first appears. The use of the same reference numbers in different figures indicates similar or identical components or features.

DETAILED DESCRIPTION

Described herein are systems and techniques for interacting with users to navigate displayed control menus and other content that are presented to a user on a display surface.

A control menu can be organized as a plurality of control groups, where each control group contains one or more controls associated with a common topic, goal, or task. Each control is associated with a command. Visually, the control groups can configured as menu panes arranged in a vertical stack, where upper menu panes at least partially obscure lower menu panes. The menu panes can be scrolled upwardly or downwardly through the stack to expose and make visible any desired one of the menu panes. Note that in this context, the vertical direction corresponds to the direction that is perpendicular to the plane of the display surface. The "upward" direction is away from the screen and the "downward" direction is into the screen.

In some embodiments, each menu pane may be designed to encompass or surround a central graphical element representing an object (such as a picture or document) that may be acted upon by selecting a control of the menu pane. The graphical element may be visible at the center of any visible pane. The controls themselves may be arranged around the outsides of their menu panes so that the controls surround and/or border the central graphical element.

A user may activate a control menu such as this by touching the graphical element that represents the target of a desired command. Once the control menu is activated, the user may scroll the menu panes upward by gradually moving his or her hand away from the display surface. The user may scroll the menu panes downward by gradually moving his or her hand toward the display surface. As the hand moves, successive menu panes are activated and made visible. When a desired menu pane is visible, the user can select one of the controls of the menu pane by moving his or hand radially or laterally outward in the direction of the control.

Although various techniques are described below in the context of menu navigation, the techniques may also be applied to other types of content, for scrolling or moving between different content views.

Figure 1:
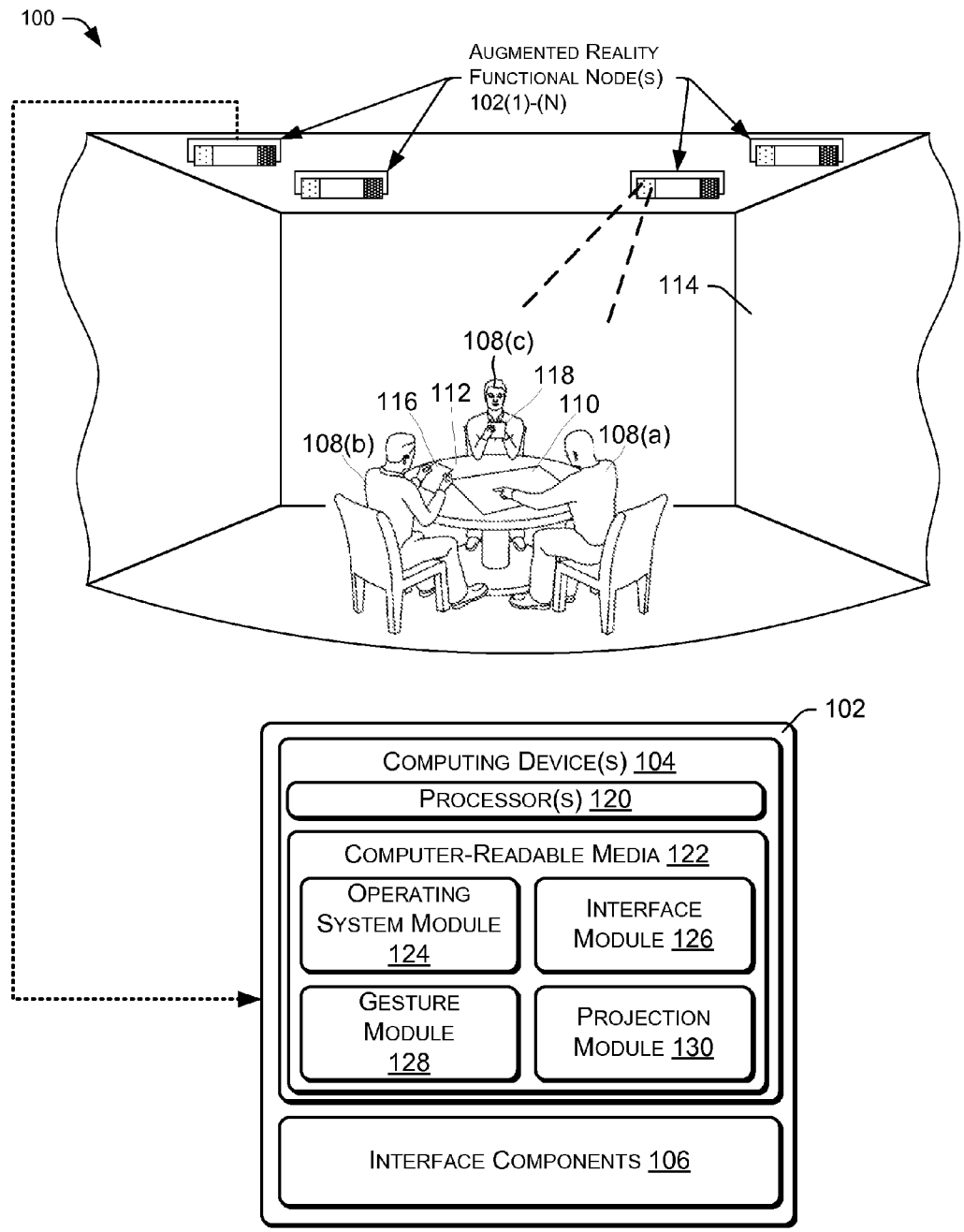
FIG. 1 illustrates an environment that includes an augmented reality functional node (ARFN) that projects content onto display areas for navigation by a user.

FIG. 1 shows an illustrative environment 100 in which the described systems and techniques may be implemented. Similar functionality may also be provided in other environments.

The environment 100 includes one or more augmented reality functional nodes (ARFNs) 102(1), ..., 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more interface components 106. The computing devices 104 and interface components 106 may be configured in conjunction with each other to interact with one or more users 108 within the environment 100. As an example, a visual workspace 110 may be projected onto a tabletop or other display surface 112 and the user may interact with the ARFN 102 by using his or her hand. The workspace 110 may comprise content such as books, drawings, illustrations, movies, photographs, user interfaces, interactive menus, and so forth.

The environment 100 may have multiple potential display locations, which may include passive objects and active devices. As an example of a passive display surface, the environment 100 may have or contain one or more surfaces upon which content may be projected. For example, content may be projected onto the tabletop 112 as shown, or onto walls 114 of the environment. As another example, a user 108(b) may hold a passive display medium 116, such as a sheet of paper, upon which content may be projected.

As an example of an active media display, a user 108(c) may hold or use a computer-like device 118 such as a tablet computer, monitor, smartphone, laptop computer, book reader, desktop computer, or other electronic display device having a display surface upon which images or other content may be displayed.

Generally, potential display areas within an environment may include furniture; handheld objects and devices; structural surfaces such as walls, floors, and ceilings; active devices such as monitors, televisions, projectors, computers, personal electronic devices; and other objects or devices having planar or non-planar display surfaces.

The computing device 104 of the example ARFN 102 may include one or more processors 120 and computer-readable media 122. The processor(s) 120 may be configured to execute instructions, which may be stored in the computer-readable media 122 or in other computer-readable media accessible to the processor(s) 120. The processor(s) 120 may include digital signal processors (DSPs).

The computer-readable media 122 may include non-transitory computer-readable storage media ("CRSM"). The CRSM 122 may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 122 may reside within a housing of the ARFN 102, on one or more storage devices accessible on a local network, on cloud storage accessible via a wide area network, or in any other accessible location.

The computer-readable media 122 may store executable components, programs, routines, modules, etc., such as instructions, datastores, and so forth that are configured to execute on the processors 120. For instance, the computer-readable media 122 may store an operating system module 124 and an interface module 126.

The operating system module 124 may be configured to manage hardware and services within and coupled to the computing device 104 for the benefit of other modules. The interface module 126 may be configured to receive and interpret commands from users within the environment 100, and to respond to such commands in various ways. For instance, the interface module 126 may analyze various input captured by components of the ARFN 102 to identify one or more hands of a user 108. In response to recognizing a hand and identifying a gesture or movement formed by the hand, the interface module 126 may interpret the gesture and cause the ARFN 102 to perform a corresponding action. For instance, if the user 108 makes a gesture requesting that the ARFN 102 project a certain piece of content, the interface module 126 may interpret the gesture and cause the ARFN 102 to project the content.

The computer-readable media 122 may include a gesture module 128 that uses various capabilities of the ARFN 102 to detect and recognize gestures or other actions made by the users 108 in the environment 100. The gesture module 128 may perform various types of image processing, including three-dimensional environment analysis, to detect positions and shapes of various items within the environment 100. In particular, the gesture module 128 may detect or identify a hand of a user 108 and may also detect the position of the hand relative to the display surface 112 and the shape of the hand and its fingers. A particular movement and shape of the hand and fingers may be interpreted as a gesture and may be acted upon in accordance with the techniques described below.

The computer-readable media 122 may also include a projection module 130 that controls projection of visual content within the environment. For example, the projection module 130 may be instructed to project interactive menus in conjunction with other content onto the display surface 112.

These various modules implemented by the computing device 104, as well as other modules not shown, may be configured collectively to perform the techniques described herein for recognizing user gestures, presenting menus and other content, and controlling navigation of content that is presented on a display surface.

The ARFN 102 may include various interface components 106, such as user interface components and other components, which may be used to detect and evaluate conditions and events within the environment 100. The interface components 106 may in certain implementations include various types of sensors and transducers, content generation devices, and so forth, examples of which will be described below with reference to FIG. 2.

In operation, the ARFN 102 and its components may project a user interface in the form of an image. For example, the ARFN 102 may project a user interface image onto a planar surface such as the tabletop 112. A user 108 may select a control that is displayed as part of the user interface image or may otherwise point or gesture in relation to the image. In response, the ARFN 102 may provide feedback to the user 108 and/or may cause performance of actions corresponding to the selection by the user 108. For instance, the ARFN 102 might project a remote control and provide feedback to the user 108 indicating which button(s) the user is in position to select, may identify a particular selection by the user 108 (e.g., a selection to power on a television) and may operate a television according to the identified selection.

As a specific example, the gesture module 128 may be configured to detect a user hand in the vicinity of workspace 110 and to analyze the position and shape of the hand and its fingers over time to identify hand gestures. Hand positions and shapes may be detected by capturing various types of images of the environment or portions of the environment in the vicinity of the workspace 110. Such images may include two-dimensional color images as well as depth maps that convey three-dimensional information regarding the environment. For example, a depth map or depth image may indicate three-dimensional coordinates of surfaces and objects within the environment 100, which may be analyzed using shape and object recognition techniques to determine the position and shape of a user hand.

As a more specific example relating to the following discussion, the gesture module 128 may be configured to detect a user hand, the distance of the user hand from the display surface 112, and whether the hand is in a "grasping" shape. "Grasping" is when the thumb is pressed against the index finger and/or the other fingers of the hand as if pinching. A user may perform a grasping gesture or motion to select an object displayed on the workspace 110. For example, the user may touch the display surface 112 in the area where the object is displayed and perform a grasping motion with the thumb and index finger to select the object. The object may then be moved by moving the hand laterally or parallel to the display surface 112. The object may be "ungrasped" or "released" using an ungrasping gesture or motion at a different location by moving the thumb and finger(s) apart.

Figure 2:
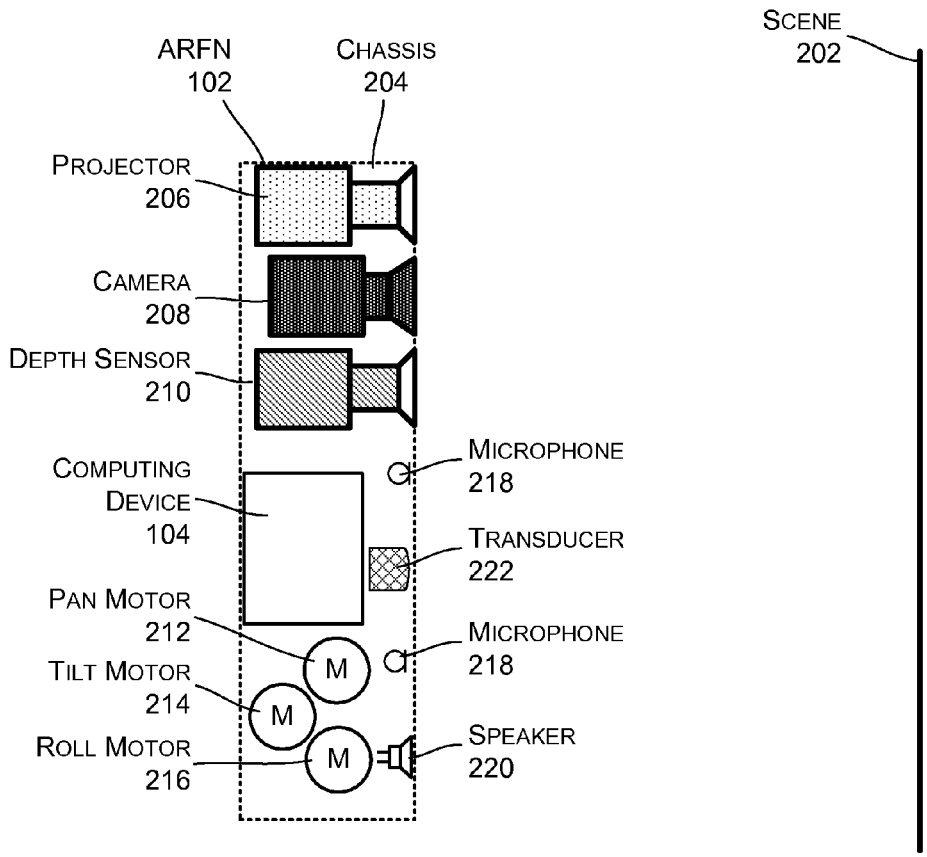
FIG. 2 illustrates an example ARFN that includes a computing device, a projector, a camera, and other selected components for allowing a user to interact with the ARFN with use of gestures interpreted by the ARFN.

FIG. 2 shows additional details of an example ARFN 102. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth, within the environment or on surfaces within the scene 202.

A chassis 204 holds the components of the ARFN 102. One or more projectors 206 may be disposed within the chassis 204 and may be configured to generate and project display images onto surfaces within the scene 202. The projector 206 may be implemented with any number of technologies capable of generating or receiving a display image and projecting that image onto a surface within the scene 202. Suitable technologies include a digital micromirror device (DMD), liquid crystal on silicon display (LCOS), liquid crystal display, 3LCD, and so forth. The projector 206 may have variable zoom and focus capabilities. Note that although the scene 202 is represented as a planar surface, it may alternatively be defined by an irregular surface and may be defined in part by various objects within a user environment 100.

One or more cameras 208 may also be disposed within the chassis 204. The cameras 208 are configured to image the scene 202 in visible light wavelengths, non-visible light wavelengths, or both. The cameras 208 may have variable zoom and focus capabilities.

One or more depth sensors 210 may also be disposed within the chassis 204. As an example, the depth sensor 210 may comprise a time-of-flight camera or other range camera for sensing three-dimensional (3D) characteristics of objects within the scene 202. Range cameras may use various technologies to determine distances to surface points of a scene. In embodiments described herein, the depth sensor 210 uses time-of-flight techniques to determine distances. Time-of-flight techniques utilize a signal that is radiated from the sensor and reflected from one or more surface points of the scene. In the described embodiments, the signal comprises a non-visible light signal, although other types of signals may also be used. For example, LIDAR technology utilizes reflected RF signals to determine distances to objects or surface points.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 206 and/or the camera 208. For example, in one implementation the actuator may comprise a pan motor 212, a tilt motor 214, a roll motor 216, and so forth. By panning, tilting, and/or rolling the chassis 204, different views of the scene 202 or different scenes within the environment 100 may be acquired.

One or more microphones 218 may be disposed within the chassis 204, or elsewhere within the environment 100. The microphones 218 may be used to acquire input from a user, to determine the location of a sound, or to otherwise aid in the characterization and receipt of input from the user environment. For example, the user may make a particular noise, such as a tap on a wall or a snap of the fingers, which is pre-designated as an attention command input. The user may alternatively use voice commands. Such audio inputs may be located using time-of-arrival differences among the microphones 218 in order to determine positions of users.

One or more speakers 220 may also be present to provide for audible output. For example, the speakers 220 may be used to provide output from a text-to-speech module or to playback pre-recorded audio.

A transducer 222 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In FIG. 2, the computing device 104 is shown within the chassis 204. In other implementations, however, all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

In other implementations, the components of the ARFN 102 may be distributed in one or more locations within the scene 202. As mentioned above, the microphones 218 and speakers 220 may be distributed throughout the environment that includes the ARFN 102. The projector 206, the camera 208, and the depth sensor 210 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
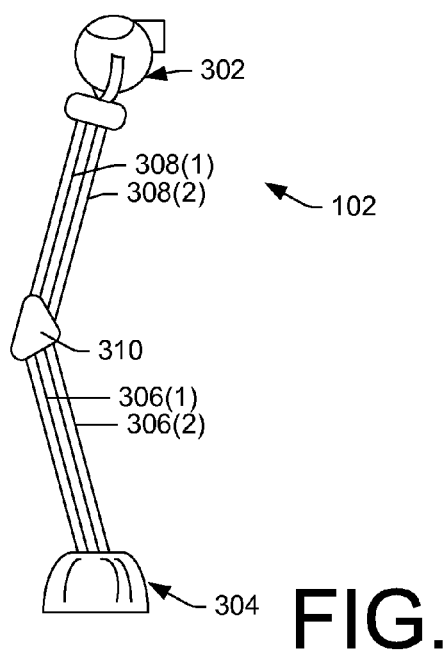
FIG. 3 shows another example ARFN.

FIG. 3 shows an example of an ARFN 102 that resembles a table lamp. In this example, the ARFN 102 has a head 302 attached to a base 304 by a movable arm mechanism. The arm mechanism has two base members or rods 306(1) and 306(2) connected to two head members or rods 308(1) and 308(2) via a joint connector 310.

The ARFN 102 may contain any of the components shown in FIG. 2 as well as other components that may be used to control and/or monitor movement of the head 302 relative to the base 304. The head 302 may contain the projector 206, the camera 208, and the depth sensor 210, for example. The base 304 may contain components such as power components, operating logic, sensor interfaces, actuator interfaces, and so forth. Generally, the components shown in FIG. 2 may be located in either the head 302 or the base 304 of the device 102.

Figure 4:
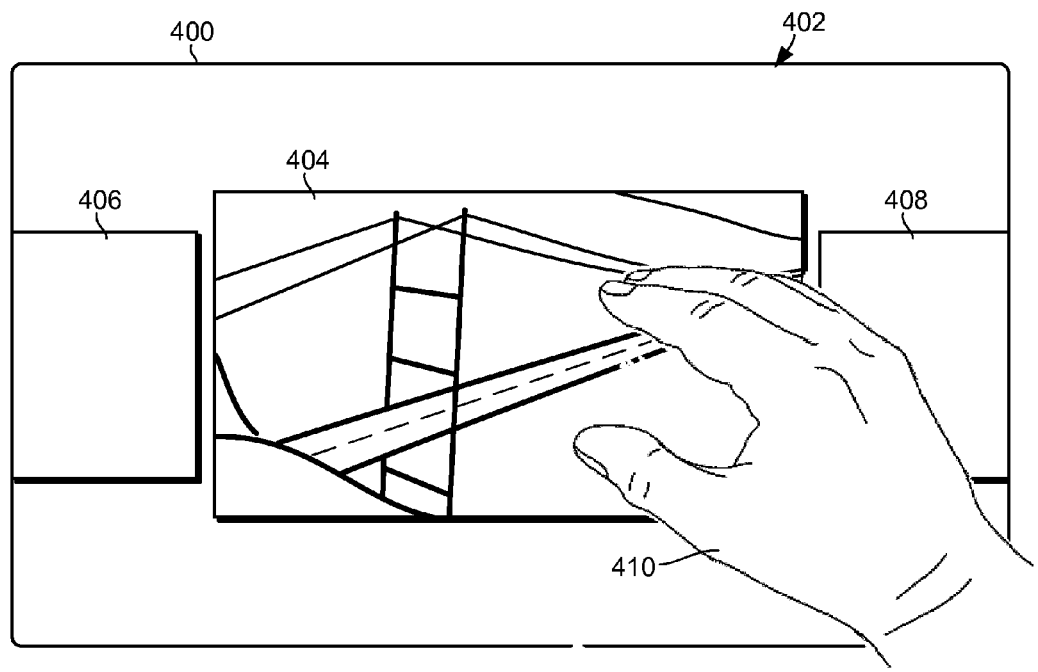
FIGS. 4-7 illustrate display of navigational content and interaction with the navigational content with a user hand.

FIG. 4 shows a display surface 400 upon which various types of content 402 may be displayed. In the embodiment discussed herein, the content 402 may be displayed by projecting an image onto the display surface 112 with the projector 108. In other embodiments, the display surface may be formed by an electronic or other active device.

In this example, the content 402 includes a graphical element 404 representing an object which may be acted upon by various controls that will subsequently be made visible to the user in accordance with the techniques described below. For example, the graphical element 404 may comprise an image, icon, or symbol that shows or represents a data object such as a file, a picture, a document, etc. The graphical element 404 may alternatively represent a physical object such as a printer, a network component, a computer host, a peripheral or accessory, a computer-controlled device, etc. In the example shown by FIG. 4, the graphical element 404 comprises a rendering of a picture file or object. The graphical element 404 is bordered in this example on its sides by additional graphical elements 406 and 408, which may represent additional pictures that can be scrolled sideways into view.

A user may interact with the graphical content 402 with his or her hand 410. For example, a user 108 may touch or nearly touch the display surface 400 in an area at which the graphical element 404 is displayed and perform a grasping or pinching gesture or motion to select the central graphical element.

Figure 5:
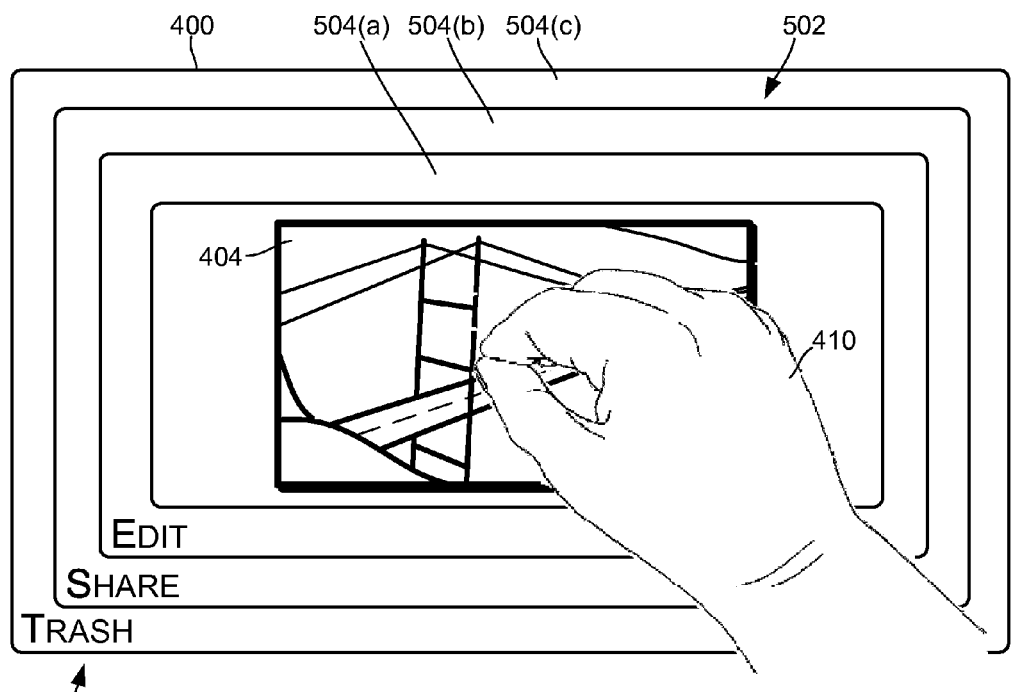

FIG. 5 illustrates a control menu 502 that is projected or otherwise displayed in response to selecting the graphical element 404 shown in FIG. 4 by pinching or grasping in the area of the graphical element 404 with the fingers of the hand 410. The graphical element 404 may be highlighted after selection to indicate that it is the target of actions or commands available from the control menu 502.

The control menu 502 is logically structured as a plurality of menu layers or control groups, where each control group has one or more visual controls. Visually, each control group may be represented by a menu pane 504 having a rectangular shape as shown or any other shape. In the example shown, the menu panes 504 are arranged concentrically with the graphical element 404, so that the graphical element 404 is central in relation to the menu panes 504 and so that the menu panes 504 encompass or surround the central graphical element 404. The graphical panes may be structured or shaped differently in different embodiments.

The menu panes 504 are organized as layers and stacked vertically so that the layers visually overlay each other and so that only one of the menu panes 504 is fully exposed and visible at any given time. Successively lower and underlying panes 504 may be increasingly larger so that their edges or peripheries are visible around the outsides of overlying panes. Each menu pane 504 may have an associated title or heading 506 that is visible in the periphery of the menu pane 504. In this example, the three illustrated menu panes 504 have the headings "TRASH", "SHARE", and "EDIT", respectively, generally indicating the types of actions that are available from within the menu panes 504.

This configuration results in a vertical stack of layered menu panes 504, where the vertical direction is assumed for purposes of discussion to be perpendicular to the plane of the display surface 400. "Upward" corresponds to an outward direction from the display surface and "downward" corresponds to an inward direction toward the display surface. The menu panes 504 of the stack can be scrolled upwardly in relation to the display surface 400 by the user moving the hand 410 away from the display surface 400. Moving or scrolling the panes 504 upwardly eventually causes the currently topmost menu pane 504 to disappear or be hidden and the next underlying pane to appear or be made visible. For example, a movement of the hand 410 away from the display surface 400 may cause a first of the menu panes 504(a) to be activated and to become fully visible. Further movement of the hand 410 away from the display surface 400 may cause a second of the menu panes 504(b) to be activated and to become fully visible. Yet further movement of the hand 410 away from the display surface 400 may cause a third of the menu panes 504(c) to be activated and to become fully visible. Movement of the hand 410 back toward the display surface 400 may cause the menu panes 504 to move back down through the stack in reverse order.

Animations may be utilized to provide visual indications that the menu panes 504 are moving upwardly or downwardly. For example, the menu panes 504 may shrink as they rise in the stack. Fading may also be used to transition between adjacent menu panes 504.

Figure 6:
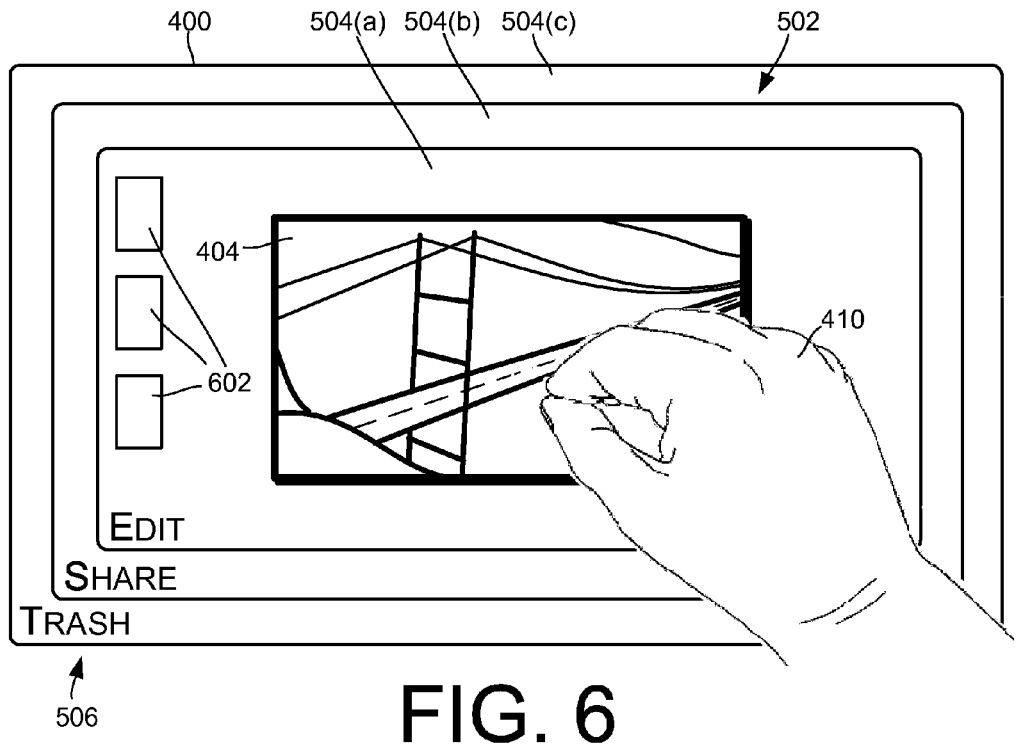

FIG. 6 shows the control menu 502 after the user has moved the menu panes 504 upwardly through the layers of the stack to activate the first menu pane 504(a). When an individual menu pane is activated its controls become visible and active. In this case, the first menu pane 504(a) represents a control group that includes graphical controls 602, which are now visible.

Each of the controls 602 is associated with a command or action that may be performed upon or with respect to the object represented by the graphical element 404. As examples, the controls 602 may correspond to actions such as "lighten," "sharpen," "crop," etc. A user may select one of the controls 602 by releasing (ungrasping or unpinching) the element 404 and then touching the displayed control. Alternatively, an individual control 602 may be selected by "dragging" the graphical element 404 to the control 602 and releasing it on the control 602.

Figure 7:
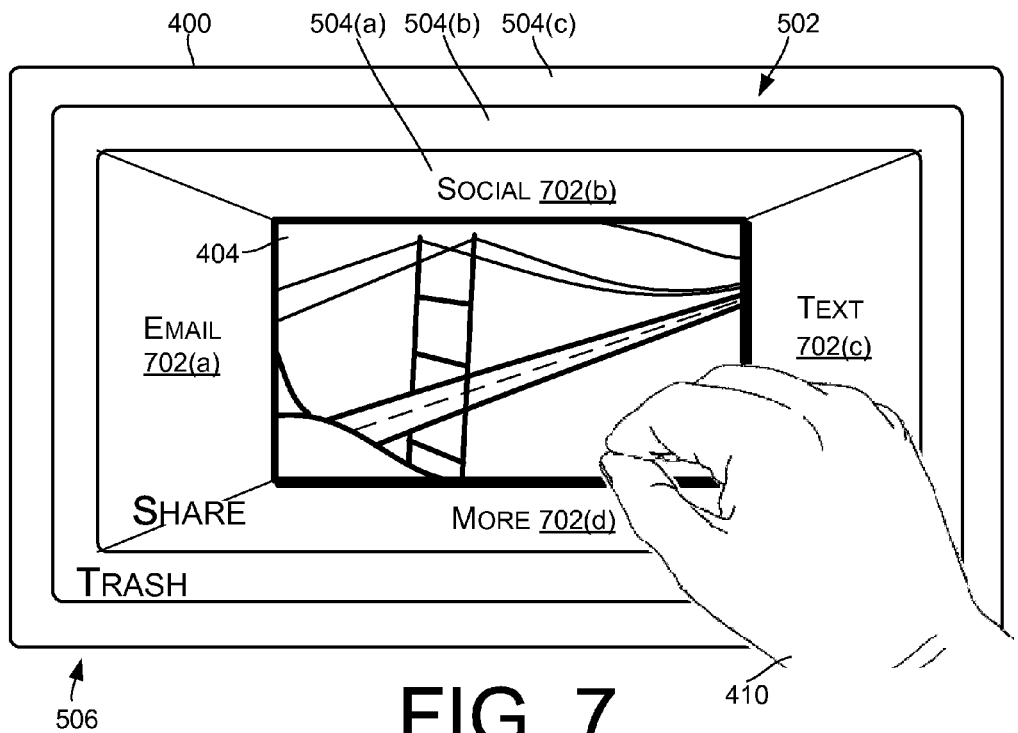

FIG. 7 shows the result of a further movement of the hand 410 away from the display surface 400. The further movement of the hand 410 causes the menu panes 504 to move upwardly within the layered stack of panes, eventually causing the second menu pane 504(b) to become activated while the first menu pane 504(a) has disappeared by being removed from the top of the stack. To emphasize the effect of raising the menu panes 504, they may be configured to shrink slightly as they rise through the stack.

The second menu pane 504(b) contains four peripheral controls 702(a), 702(b), 702(c), and 702(d), formed as non-rectangular areas or shapes between the graphical element 404 and the outer edges of the second menu pane 504(b). In this example, the controls 702 border and surround the central graphical element 404. The controls 702 are associated with commands that may be performed with respect to the object represented by the graphical element 404. As a specific example, the control 702(a), titled "Email," may be selected to email the picture represented by the graphical element 404. The control 702(b), titled "Social", may be selected to share the picture using social media networks. The control 702(c) may be selected to send the picture using a text message. The control 702(d) may be selected to access additional commands.

An individual peripheral control 702 may be selected by performing a hand motion. Specifically, the hand 410 may be moved in a direction from the graphic element 404 to the desired control 702 while ungrasping the central graphic element. Appropriate animations may be displayed to further suggest a concept of physically moving the element 404 and "throwing" or "flinging" the element 404 toward the desired control or control area. The "throwing" or "flinging" movement may be performed while continuing to hold the hand at the distance from the display surface 400 that was previously achieved when navigating to the current menu pane 504(b).

The control menu 502 may be canceled at any time by releasing the graphical element 404 without selecting a control. Upon cancelling the selection of the graphical element 404 in this manner, the original graphical content 402 is restored as shown in FIG. 4.

Figure 8:
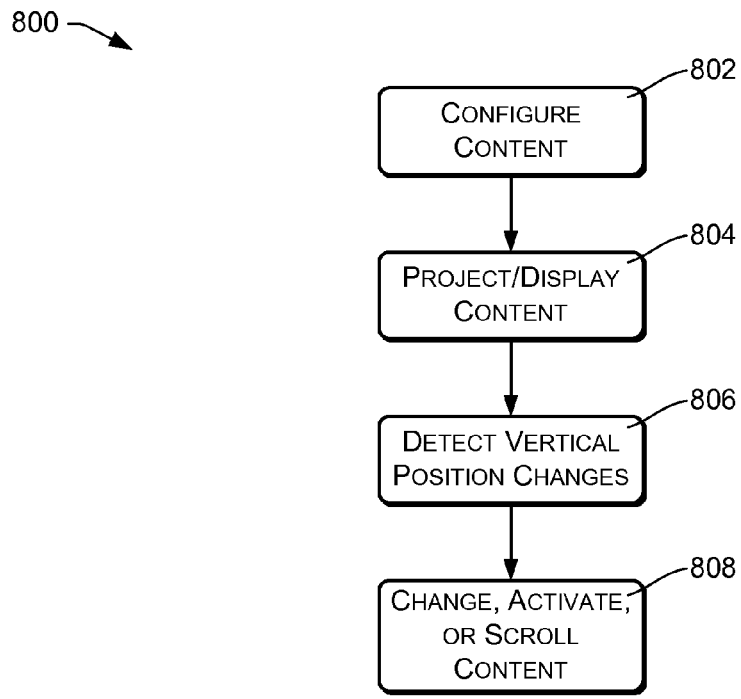
FIGS. 8 and 9 are flowcharts illustrating example methods of navigating displayed content using hand movements and/or gestures.

FIG. 8 illustrates an example of navigating menus and other content in response to movement of a user hand toward and away from a display surface.

An action 802 comprises logically configuring content for use in a vertical navigation scheme on a display surface. The content may comprise menus, drawings, pictures, text, etc. The display surface may comprise a passive surface such as the tabletop or walls of FIG. 1 or an active device such as an electronic display having a grid of individual lighting elements or pixels.

Elements of the content are organized in layers or groups so that they have or correspond to different depths. The content layers can be visually scrolled upwardly and downwardly through a viewing position or plane so that different layers or depths of content can be viewed. As used herein, the term "upward" refers to an outward direction, away from the display surface. The term "downward" refers to an inward direction, toward the display surface. The display surface may be planar or non-planar.

Certain types of content may have elements or layers that correspond naturally or inherently to depth. For example, three-dimensional graphical information may be presented as multiple two-dimensional images corresponding to different depths or layers of an object or scene. Other types of content, such as the menu control groups described above, may be organized as layers or groups and relative depths may be arbitrarily assigned to the groups.

In the specific embodiment described above, the action 802 comprises configuring a control menu as a plurality of control groups, layers, or panes that concentrically surround a graphical representation of a data object or other object. Control panes may be configured as a sequence of increasingly larger graphical panes surrounding the displayed representation of the data object.

Each control pane contains one or more graphical controls that are selectable to act upon the object that is represented by the central graphical element. Each of the graphical controls is associated with a command that is executable to perform an action with respect to the object. Within each pane, the graphical controls may be configured to outwardly border the graphical representation of the object.

The configuring action 802 may further comprise visually arranging or stacking the control panes at different depths relative to each other. In this arrangement, a first control pane at a first depth may be partially obscured by a second, overlying control pane at a second depth.

An action 804 comprises projecting or otherwise displaying the configured content on a display surface. In the embodiment illustrated, this may be performed with a projector. Other embodiments may use different mechanism for displaying the content. When the content comprises a menu, the menu may be displayed in response to a grasping motion or gesture by the hand of a user.

An action 806 comprises detecting changes in vertical distance between the display surface and the user hand or other object. As described above, this may be performed by the ARFN 102 by analyzing various images of the user environment over time. The ARFN 102 may detect the position of the user hand and the shape or configuration of the fingers of the hand. This information may be used to detect gestures such as grasping and ungrasping. In other embodiments, distances between a display surface and a hand or object may be determined using different types of sensors, including proximity sensors, time-of-flight measurement devices, and so forth.

An action 808 comprises changing, activating, or scrolling elements of the displayed content in response to the detected changes in hand or object position relative to the display surface and displayed content. In the particular embodiment described herein, the action 808 may comprise activating different panes or control groups in response to the detected changes in hand or object position. For example, the action 808 may comprise successively activating individual ones of the control panes in sequential correspondence with successive changes in the distance of a hand from the display surface. Activating an individual control pane comprises making the graphical controls of the control pane visible and active. When a control is active, it can be selected to perform a corresponding command or action. Further upward movement of the panes through layer of the stack causes the otherwise topmost and active control pane to be deactivated and hidden as the next lower control layer or pane become activated and visible.

In the stacked arrangement described above, the action 808 may comprise visually moving or scrolling menu groups or panes through layers of a vertical stack in response to the detected changes in hand or object position. More specifically, the control panes may be configured to move visually upward through a visual stack of panes as the hand move away from the display surface. The control panes may be configured to move visually downward through the visual stack of panes as the hand moves toward and closer to the display surface. An individual control pane is activated when it is moved to the top of the stack of control panes. Further upward movement of the panes within the stack causes the otherwise topmost and active control plane to be deactivated and hidden as the next lower control pane become activated and visible.

In some embodiments, the action 808 may comprise activating a first of a plurality of control panes or groups on a display surface and then detecting a first change in a distance of a hand or object from the display surface. In response to detecting the first change in the distance, a second of the control panes is activated and therefore made visible, while the first control pane is deactivated and hidden. In response to detecting a second change in the distance, a third of the control panes is activated and therefore made visible, while the second control pane is deactivated and hidden.

Figure 9:
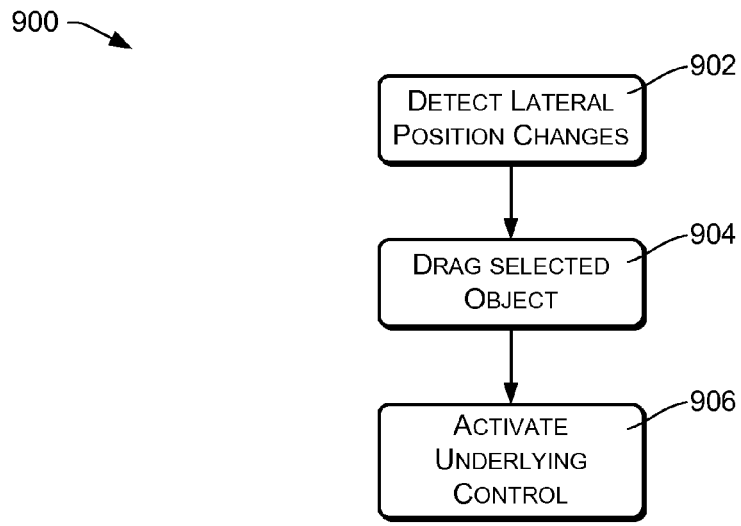

FIG. 9 illustrates an example method 900 of navigating using lateral movement of a user hand relative to a display surface. An action 902 comprises detecting lateral movement of a user hand. The term "lateral" is used herein to indicate movement of the hand in a direction that is substantially parallel to the display surface.

In response to lateral hand movement, any graphical object that has been selected by the user, such as by grasping the graphical object, is moved in an action 904 in the same direction as the hand movement. The user may ungrasp or release the graphical object over an underlying control. An action 906 is performed of activating the underlying control when the object is released over the control. Alternatively, some controls may be activating by "flinging" the object toward the control, such as by moving the hand in the direction of the control and then ungrasping the object while the hand is still moving.

Various graphical design features and animations may be used in conjunction with the techniques described above to impart desired visual metaphors to the appearance and movement of control panes and other elements. For example, the central graphical element 404 may be made to appear as if rising up through different content layers as the hand 410 rises. Alternatively, the layers themselves may be made to appear as if they are moving past the central graphical element 404, which appears to be at a fixed depth. Furthermore, sizes and shapes of the various elements may be continuously varied to emphasize the visual characteristic of upward and downward movement.

The actions described above provide an intuitive way for a user to navigate through various types of content. Although the techniques have been described primarily in relation to navigation using a menu system with accompanying controls, the described techniques can also be used to navigate through different types of content, including passive content. Furthermore, although a particular menu configuration is shown and discussed, other menu shapes and graphical metaphors may be used in conjunction with the hand movements and gestures described herein. For example, menu groups may be represented by or within linear panes, as elements of rotating wheels or discs, or using any of many other graphical concepts.

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a projector;
   one or more computer-readable media storing computer-executable instructions that, when executed by the one or more processors, cause the one or more processors to perform acts comprising:
      projecting a graphical representation of an object onto a display surface with the projector;
      in response to a grasping gesture of a hand over the graphical representation, projecting a control menu onto the display surface with the projector, the control menu comprising a plurality of control panes that are visually arranged concentrically in a stack at different depths relative to each other, wherein each control pane comprises one or more selectable graphical controls that outwardly border the graphical representation of the object;
      detecting a first movement of the hand away from the display surface;
      in response to detecting the first movement, (a) making a first of the control panes visible and (b) making the graphical controls of the first control pane available for selection;
      detecting a second movement of the hand away from the display surface; and
      in response to detecting the second movement of the hand away from the display surface, (a) making a second of the control panes visible, (b) making the graphical controls of the second control pane available for selection, (c) at least partially hiding the first control pane, and (d) making the graphical controls of the first control pane unavailable for selection.

2. The system of claim 1, further comprising:
   visually moving the control panes through the stack as the hand moves away from the display surface;
   wherein an individual control pane when at a first depth is at least partially obscured by an overlaying control pane at a second depth; and
   wherein the individual control pane when at the second depth is visible.

3. The system of claim 1, wherein:
   the configuring comprises associating each of the graphical controls with a command that is executable to act upon the object; and
   the acts further comprise executing the command associated with a particular graphical control in response to movement of the hand in a direction outward from the graphical representation to the particular graphical control.

4. A method comprising:
   projecting a graphical representation of an object onto a display surface with the projector;
   detecting a gesture of a hand over the graphical representation of the object;
   projecting a control menu onto the display surface with the projector, the control menu comprising a plurality of menu layers that are visually arranged concentrically in a stack at different depths relative to each other, wherein each menu layer comprise one or more graphical controls that outwardly border the graphical representation of the object;
   detecting a first change in a distance of the hand from the display surface;
   in response to detecting the first change, making one or more graphical controls of a first menu layer of the plurality of menu layers available for selection;
   detecting a second change in the distance of the hand from the display surface; and
   in response to detecting the second change, making one or more graphical controls of a second menu layer of the plurality of menu layers available for selection, and making the one or more graphical controls of the first menu layer unavailable for selection.

5. The method of claim 4, further comprising:
   detecting a third change in the distance of the hand from the display surface; and
   in response to detecting the third change, (a) displaying a third menu layer of the plurality of menu layers on the display surface, (b) making one or more graphical controls of the third menu layer available for selection, and (c) at least partially hiding the second menu layer.

6. The method of claim 4, further comprising:
   visually moving the menu layers through at least first and second depths relative to the display surface as the hand moves away from the display surface.

7. The method of claim 4, wherein:
   the displaying of the first menu layer is performed in response to a grasping gesture by the hand.

8. The method of claim 4, wherein:
   the displaying of the first menu layer is performed in response to a grasping gesture by the hand; and
   the method further comprising selecting one of the one or more graphical controls in response to an ungrasping gesture by the hand.

9. The method of claim 4, wherein:
   displaying the first menu layer comprises projecting the first menu layer onto the display surface with the projector; and
   displaying the second menu layer comprises projecting the second menu layer onto the display surface with the projector.

10. The method of claim 4, wherein the display surface comprises an electronic display device.

11. The method of claim 4, further comprising arranging the one or more graphical controls of the first menu layer and second menu layer to graphically border the displayed representation of the object to be acted upon by the one or more graphical controls.

12. The method of claim 4, wherein the display surface is planar.

13. One or more non-transitory computer-readable storage media storing computer-executable instructions that, when executed by one or more processors, cause the one or more processors to perform acts comprising:
   projecting a graphical representation of an object onto a display surface with a projector;
   detecting a gesture of a hand over the graphical representation of the object;
   projecting a control menu comprising a plurality of content layers that are visually arranged concentrically in a stack at different depths relative to each other, wherein each content layer comprises one or more graphical controls that outwardly border the graphical representation of the object;

detecting a first change in a distance of the hand from the display surface;

in response to detecting the first change, making the one or more graphical controls of a first content layer available for selection;

detecting a second change in the distance of the hand from the display surface; and in response to detecting the second change, making the one or more graphical controls of a second content layer available for selection, and making the one or more graphical controls of the first content layer unavailable for selection.

14. The one or more non-transitory computer-readable storage media of claim 13, the acts further comprising:

detecting a third change in the distance of the hand from the display surface; and in response to detecting the third change, displaying a third content layer on the display surface and at least partially hiding the second content layer.

15. The one or more non-transitory computer-readable storage media of claim 13, the acts further comprising:

visually moving the content layers through at least first and second depths relative to the display surface as the hand moves away from the display surface.

16. The one or more non-transitory computer-readable storage media of claim 13, wherein:

the displaying of the first content layer is performed in response to a grasping gesture by the hand.

17. The one or more non-transitory computer-readable storage media of claim 13, wherein the display surface is planar.

18. The one or more non-transitory computer-readable storage media of claim 13, wherein the display surface comprises an electronic display device.

19. The one or more non-transitory computer-readable storage media of claim 13, the acts further comprising projecting the first content layer and second content layer onto the display surface with the projector.

\* \* \* \* \*